United States Patent [19]

Hejna, Jr. et al.

[11] Patent Number: 5,287,508
[45] Date of Patent: Feb. 15, 1994

[54] METHOD AND APPARATUS FOR EFFICIENT SCHEDULING IN A MULTIPROCESSOR SYSTEM

[75] Inventors: Donald J. Hejna, Jr., Sunnyvale; Barry P. Medoff, Palo Alto, both of Calif.

[73] Assignee: Sun Microsystems, Inc., Mountain View, Calif.

[21] Appl. No.: 864,681

[22] Filed: Apr. 7, 1992

[51] Int. Cl.⁵ .............................................. G06F 9/46
[52] U.S. Cl. ........................... 395/650; 364/DIG. 1; 364/228.2; 364/228.3; 364/230.3; 364/281.6; 364/281.8; 364/231.6
[58] Field of Search ............... 364/DIG. 1 MS File; 395/650, 200

[56] References Cited

U.S. PATENT DOCUMENTS

| | | | |
|---|---|---|---|
| 4,394,727 | 7/1983 | Hoffman et al. | 364/DIG. 1 |
| 4,805,107 | 2/1989 | Kieckhafer et al. | 364/DIG. 1 |
| 4,954,945 | 9/1990 | Inoue | 364/DIG. 1 |
| 4,985,831 | 1/1991 | Dulong et al. | 364/DIG. 1 |
| 5,185,861 | 2/1993 | Valencia | 395/200 |

*Primary Examiner*—Thomas M. Heckler
*Attorney, Agent, or Firm*—Blakely Sokoloff Taylor & Zafman

[57] ABSTRACT

In the present invention a predetermined number of bits are added to each entry in the process table. These bits are used to indicate the warmth of the cache with respect to the particular schedulable unit such as a process or thread of a process. The scheduler will then review, not only the priority of the schedulable unit, but the warmth of the cache in order to determine the schedulable unit to be scheduled next with respect to a particular processor. For example, these cache warmth bits may be used to identify the processor the schedulable unit previously executed on such that the scheduler will only schedule the schedulable unit with the processor previously executed on in order to take advantage of the schedulable unit data located in the the cache associated with the processor. The system may be extended to provide more sophisticated models for determining cache warmth and the scheduling of processes and process threads.

21 Claims, 7 Drawing Sheets

AT TIME t0:

|  | PROCESSOR 1 | PROCESSOR 2 |
|---|---|---|
| CACHE CONTENTS: | [          ] | [          ] |
| PROCESS CONTEXT: | [          ] | [          ] |

IN PROCESS QUEUE: A,B,C,D,E

Figure 1a

AT TIME t1:

|  | PROCESSOR 1 | PROCESSOR 2 |
|---|---|---|
| CACHE CONTENTS: | A |  |
| PROCESS CONTEXT: | A |  |

IN PROCESS QUEUE: B,C,D,E

Figure 1b

AT TIME t2:

|  | PROCESSOR 1 | PROCESSOR 2 |
|---|---|---|
| CACHE CONTENTS: | A | B |
| PROCESS CONTEXT: | A | B |

IN PROCESS QUEUE: C,D,E

Figure 1c

AT TIME t3:

|  | PROCESSOR 1 | PROCESSOR 2 |
|---|---|---|
| CACHE CONTENTS: | A/C | B |
| PROCESS CONTEXT: | C | B |

IN PROCESS QUEUE: D,E,A

Figure 1d

AT TIME T4:

|  | PROCESSOR 1 | PROCESSOR 2 |
|---|---|---|
| CACHE CONTENTS: | A/C | B/D |
| PROCESS CONTEXT: | C | D |

Figure 1e
(Prior Art)

| PROCESS | PROCESSOR AT EACH TIME | | | | | | | | | | | | | | |
|---|---|---|---|---|---|---|---|---|---|---|---|---|---|---|---|
| | t0 | t1 | t2 | t3 | t4 | t5 | t6 | t7 | t8 | t9 | t10 | t11 | t12 | t13 | t14 |
| A | 0 | 1 | | | 1 | 1 | | | | 0 | 0 | | | | |
| B | 1 | 0 | 0 | 1 | | 0 | 0 | 1 | | | 1 | 1 | | | |
| C | | | 1 | 0 | | | 1 | 0 | 0 | | 1 | 0 | 0 | | |
| D | | | | | | | | | 1 | 1 | | | 1 | 1 | |
| E | | | | | 0 | | | | | | | | | 0 | 0 |

| PROCESS | CACHE WARMTH | CONTEXT | ADDRESS |
|---|---|---|---|
| A | | | |
| B | | | |
| C | | | |
| D | | | |
| E | | | |

*Figure 3*

| A | 01 | |
|---|----|---|
| B | 10 | |
| C | 11 | |

*Figure 4a*

| A | 01 | 11 | |
|---|----|----|---|
| B | 10 | 10 | |
| C | 11 | 01 | |
| D | 01 | 00 | |

/* Scheduler: Makes use of cache warmth to schedule efficiently.
   This pseudo code runs on a given processor and decides which process to run.
*/

```
static   warmth_buff=0, last_warmth_buff=0;
static   sticky_mode;

schedule(proc_list_ptr)
       struct *proc_list_ptr[];
{
  int id;
  int proc, next_proc;

if (sticky_mode == 1)
    {
       sticky_mode = 0;
       return;                   / * to keep active process running */
    }
park(active_process);
get_warmth(&warmth_buff);    /* get warmth value of last running process *.
get_processor_id(&id);       /* get processor the scheduler is running on *
if (check_thrash(warmth_buff, last_warmth_buff))
   sticky_mode=1;            /* reset scheduling interval * 2 */
active_process.warmth += warmth_buff;
for (proc in *proc_list_ptr)
  {
     if (proc_list_ptr[proc.].last_id == id)       /* ran on same processor last time
       if (max < (prod_list_ptr[proc].warmth -= warmth_buff))
       {
          next_proc = proc;
          max = prod_list_ptr[proc].warmth;
       }
  }
add_parked_process(proc_list_ptr);          /* adds process F to the process list
unpark_process(proc_list_ptr, next_proc);   /* gets new process to run and runs
last_warmth_buff = warmth_buff;             /* update the last_warmth value *
   return;
}
check_thrash(new,last)
int new,last;
{
if ((new > threshold)
    &&
    (last > threshold))
   return 1;
else
  return 0;
}
```

*Figure 6*

METHOD AND APPARATUS FOR EFFICIENT SCHEDULING IN A MULTIPROCESSOR SYSTEM

BACKGROUND OF THE INVENTION

1. Field of the Invention

The present invention relates to a method and apparatus for improving the efficiency of process scheduling in a multiprocess system.

2. Art Background

In a time sharing computer system the CPU is allocated to a process for a pre-determined period of time called a time-slice or time quantum at the end of which the process is pre-empted and a second process is scheduled to begin at the start of the first new time-slice. The process preempted is then rescheduled to continue execution at a later time-slice. Process scheduling techniques are employed to determine the order in which processes have access to the CPU.

Process scheduling techniques have been extended to multiple-CPU computer systems. Processes are allocated a time-slice according to the CPU available. A process table is maintained which identifies each process to be executed. Each process table entry identifying a process contains a priority field for a process scheduling. For example, the priority of a process may be a function of the amount of its CPU usage with processes getting a lower priority if they have recently used the CPU. A process scheduler accesses the process table information and controls which processes are allocated the usage of the CPU. For information on process scheduling see *The Design of the UNIX ® Operating System*, Maurice J. Bach, pages 247-258 (Prentice-Hall, Inc., 1986) and *Operating System Concepts*, 3rd Ed., Silber Schetz, Peterson and Galvin, pages 97-125 (Addison-Wesley, 1991).

Figure 1A:
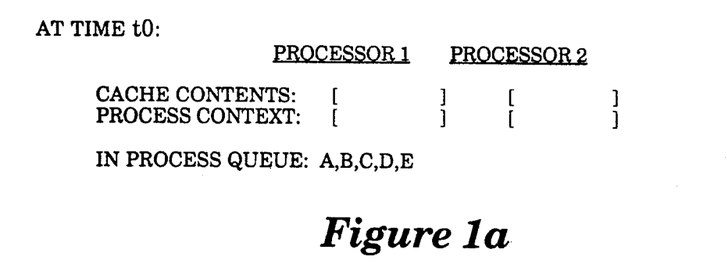
FIG. 1a-1f illustrate the prior art process of scheduling.

Typically in a multiple CPU system, the scheduler will allocate the next available CPU to the process having the highest priority for scheduling. However, as the multiple process systems become more sophisticated, other factors must be considered in scheduling processes to achieve the best results. In particular, in a multiple CPU system, cache memories are now allocated to each CPU. Applying currently known scheduling techniques results in poor usage and efficiency of the cache memories. This is illustrated with respect to FIG. 1. FIG. 1a shows at time T0, there are five processes in the process queue indicating those processes are ready to be executed: A, B, C, D, and E. Since no processes have been executed at time T0, the cache contents and the process context for each processor are empty.

Figure 1B:
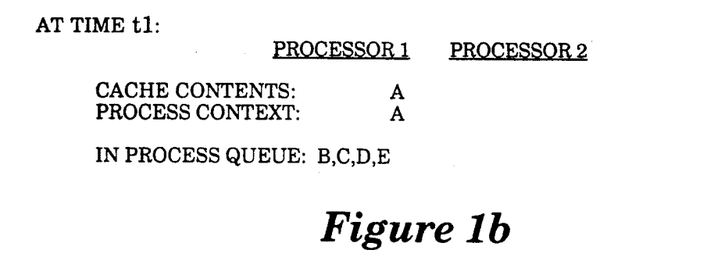
Figure 1C:
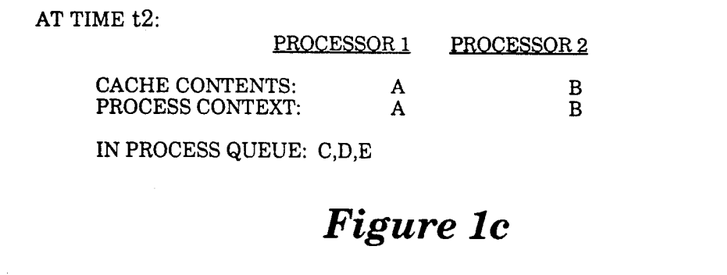
Figure 1D:
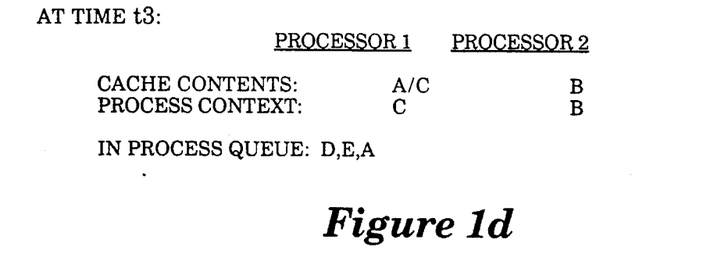
Figure 1E:
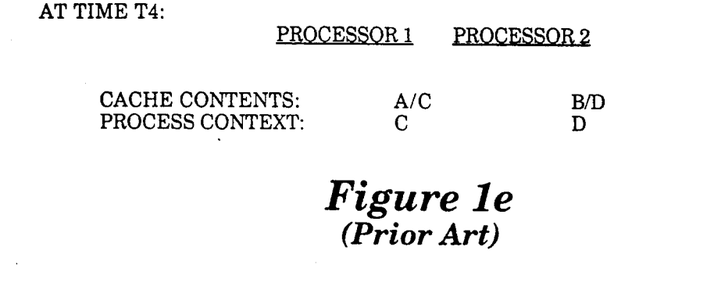

Referring to FIG. 1b at time T1, the first process is allocated to the first processor, Processor 1. Thus, the process context currently executing on Processor 1 is Process A and contents of the cache contain data related to Process A. At time T2, referring to FIG. 1c, the next process of highest priority is allocated to execute on Processor 2. Therefore, the process context of Processor 2 is Process B and the contents of the cache contain data related to Process B. At time T3, as shown in FIG. 1d, a context switch is performed wherein Process A is swapped out from the CPU and the process of highest priority, Process C, is swapped in to be executed by Processor 1. Thus, the context of Processor 1 is Process C. After some execution of Process C, the cache contents will contain data related to Process C as well as pre-existing data located in the cache related to Process A. At time T4, referring to FIG. 1e, a context switch is performed on Processor 2, wherein Process B is swapped out and Process D, the next process to be executed, is swapped in. Thus, Processor 2 is executing Process D and the cache contents of the cache memory associated with Processor 2 contains a mixture of data related to Process B and Process D. Continuing the pattern, it is evident that Process E will be scheduled on Processor 1 and Processor 2 will pick Process A from the run queue to execute next. This exposes a critical flaw in extending current scheduling algorithms to multiple CPU systems. In particular, current scheduling algorithms do not account for performance penalty of process shuffling among multiple processors. This penalty results from a "cold start" of the cache on the new processor which could avoided by scheduling the process on a CPU whose cache already contains data associated with the process. A method of scheduling which weighs this penalty in the scheduling algorithm would greatly improve the performance. For purposes of the following discussion, a cache is said to be cold relative to a particular process when it contains little or no data required for the execution of that process and accesses to the cache will miss. A cache is said to be warm with respect to a particular process when it contains data required for the execution of the process and accesses to the cache will hit.

Figure 1F:
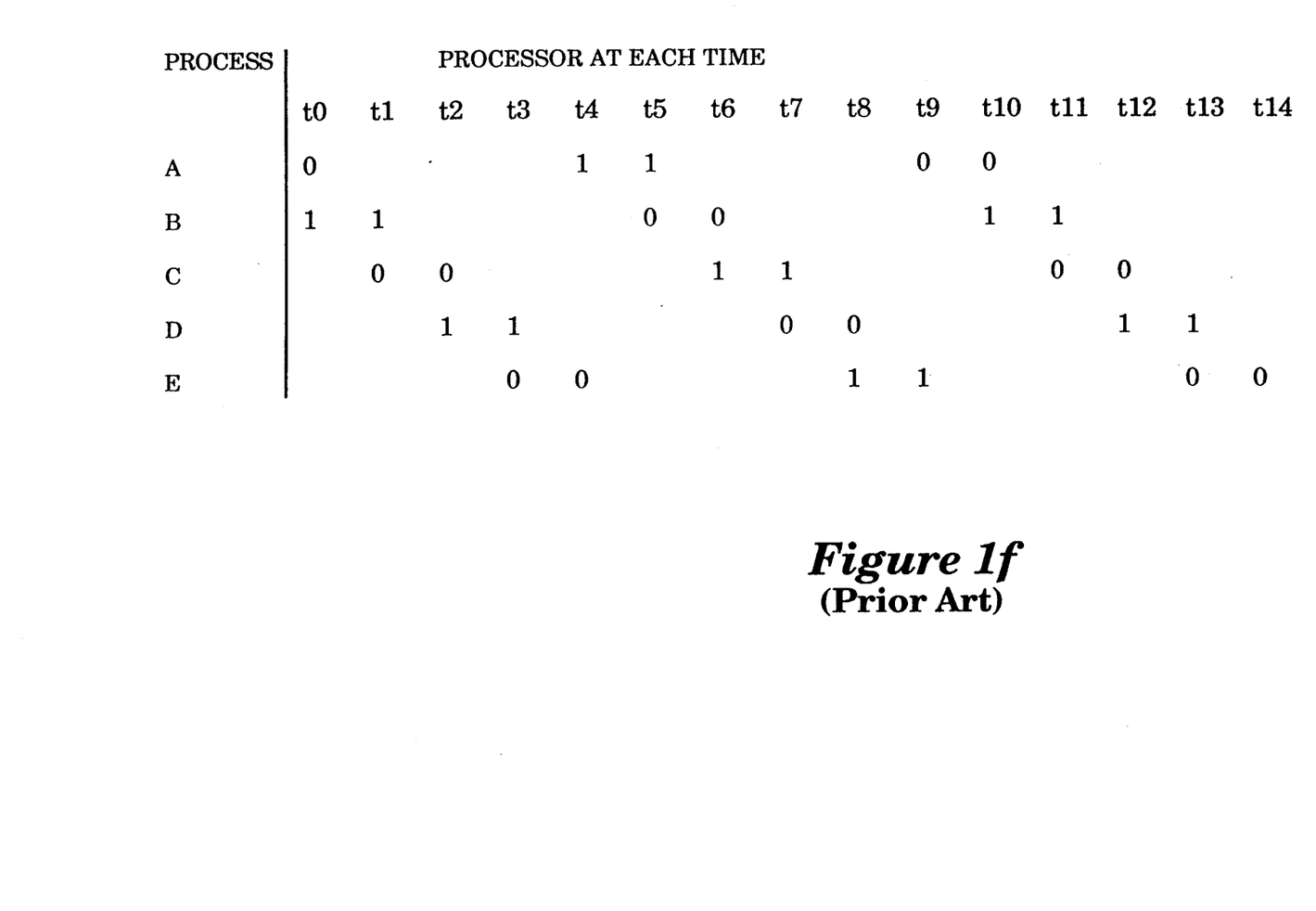

Referring to FIG. 1f, the pattern of processor allocation can be extended to the processors so that over time a history of processors each process executes on can be determined. Note that Process A, which previously ran on Processor 0 will be restarted on Processor 1 and will not execute on Processor 0 until two processes (C and E) have previously executed on Processor 0. This ensures that much of the data from Process A in Processor 0's cache will have been replaced with data from Processes C and E. If the scheduling interval is approximately equal to the time it takes for the executing process to fill half of the cache, it can be seen that each process executes at best from a half-full cache when one or more intervening process have run on the CPU. Rescheduling takes place at every other time interval, such that the rescheduling executions are out of phase with one another.

SUMMARY OF THE INVENTION

It is therefore an object of the present invention to provide a scheduling algorithm to account for the performance penalty of process shuffling among multiple processors and resources.

It is an object of the present invention to provide a system which schedules processes according to the priority of the process as well as the cache warmth of the cache associated with a particular processor.

In the present invention a predetermined number of bits are added to each entry in the process table. These bits are used to indicate the warmth of a processor's resource, such as a cache, with respect to a schedulable unit, such as a particular process or thread of a process. The scheduler will then review, not only the priority of the schedulable unit, but the warmth of the cache in order to determine the schedulable unit to be scheduled next with respect to a particular processor. For example, these cache warmth bits may be used to identify the processor the schedulable unit previously executed on such that the scheduler will only schedule the schedulable unit to run on the processor it previously executed on, in order to take advantage of the data (e.g., process instructions and process data) located in the cache associated with the specific processor. The system may be extended to provide more sophisticated models for determining cache warmth and the scheduling of schedulable units, such as processes and threads of processes.

BRIEF DESCRIPTION OF THE DRAWINGS

The objects, features and advantages of the present invention will be apparent from the following detailed description in which.

DETAILED DESCRIPTION OF THE INVENTION

Figure 2:
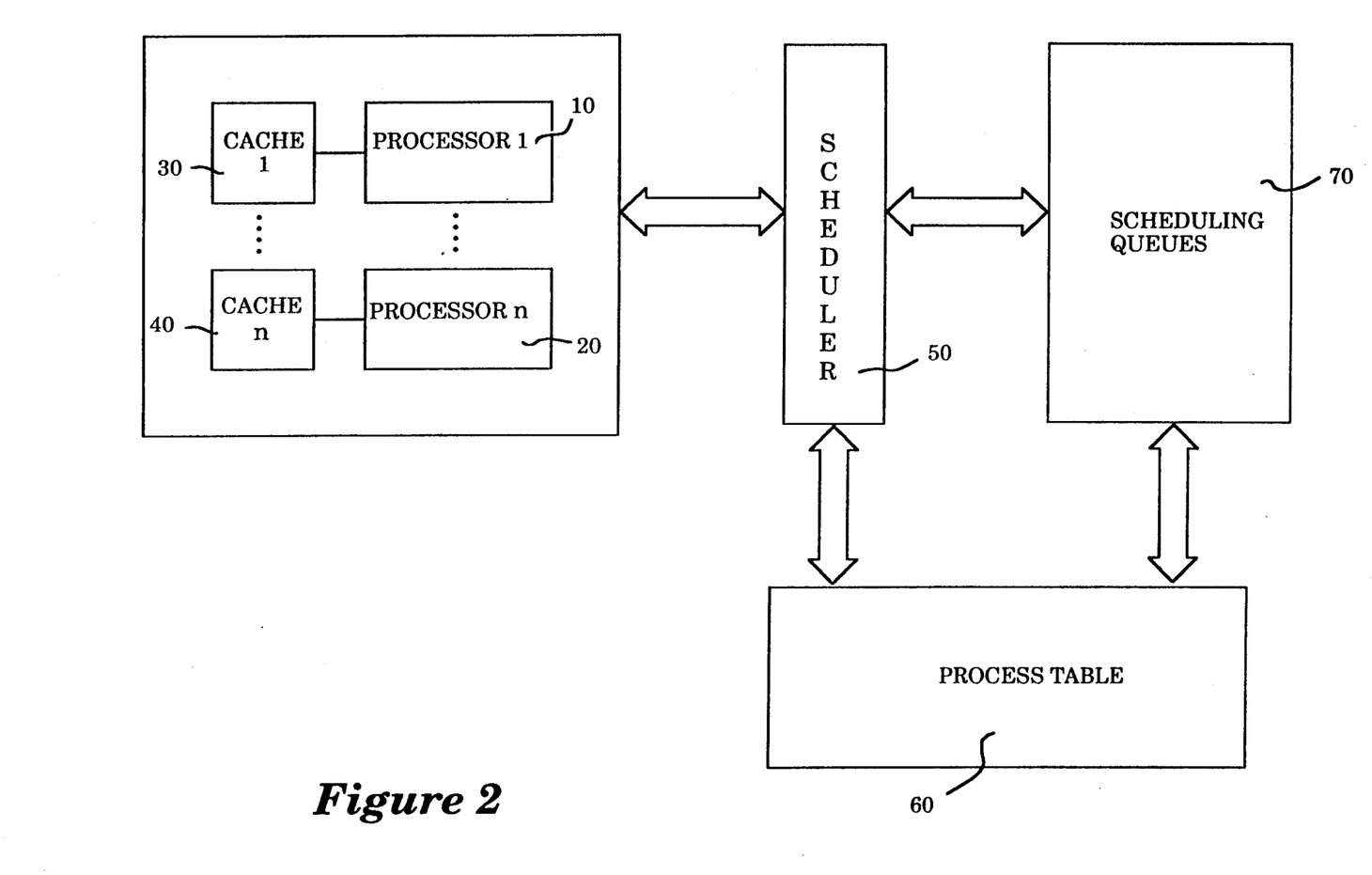
FIG. 2 illustrates the preferred embodiment of the system of the present invention.
Figure 3:
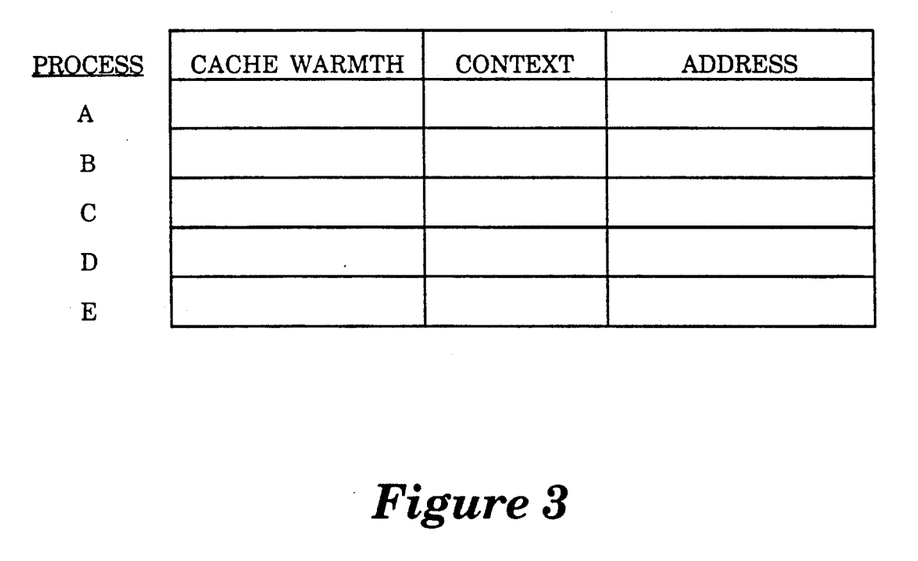
FIG. 3 illustrates a process table containing the warmth bits used by the scheduler to schedule processes in a multiple process, multiple cache system.

FIG. 2 illustrates a system for implementing the process of the present invention. A plurality of processes are executed by a plurality of processors 10, 20. Each processor 10, 20 has a cache 30, 40 associated with it. The scheduler 50 determines which process to assign to an available processor. The process table 60, FIG. 3, contains data regarding each active process including the system level context of the process, the virtual address memory management information and, in the present invention, status bits indicative of the warmth of the cache associated with the processor upon which the process was executed. By using priority information as well as cache warmth, scheduling queues 70 may be utilized to identify the order of processes to be executed. The number of bits required to indicate cache warmth is dependent upon the extent of information desirable. For example, in one embodiment, a number of bits is used to identify the processor number of the processor upon which the process was last executed. This similarly will indicate the cache which contains data related to the process or the cache which most likely will contain data related to the process. Further information such as a count of cache misses or a warmth count may also be represented to allow for more efficient scheduling algorithms.

Figure 4A:
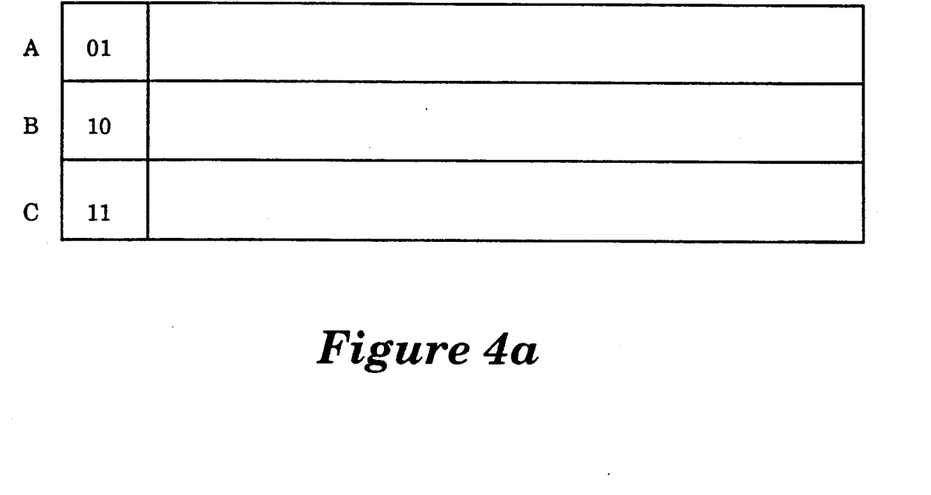
FIG. 4a and 4b illustrate embodiments of a process table containing cache warmth bits used by the scheduler to schedule processes in a multiple process, multiple cache system.

FIG. 4a illustrates one embodiment of the present invention. Referring to FIG. 4a, if Process A was previously executed on Processor 1, the cache warmth bits may identify a value of 1 indicative of Processor 1. Similarly, if Process B executed previously on Processor 2, the binary value 10 identifies that Process B was executed by Processor 2. It follows that if Process C was executed by Processor 3 a value of 11 would be indicative of the cache warmth of the cache associated with Processor 3. Thus, the scheduler will schedule Process A with Processor 1 in order to minimize the number of cache misses and maximize usage of the data associated with Process A already contained in Processor 1's cache, which was previously stored in the cache during the earlier time-slice Process A was executed by Processor 1.

Figure 4B:
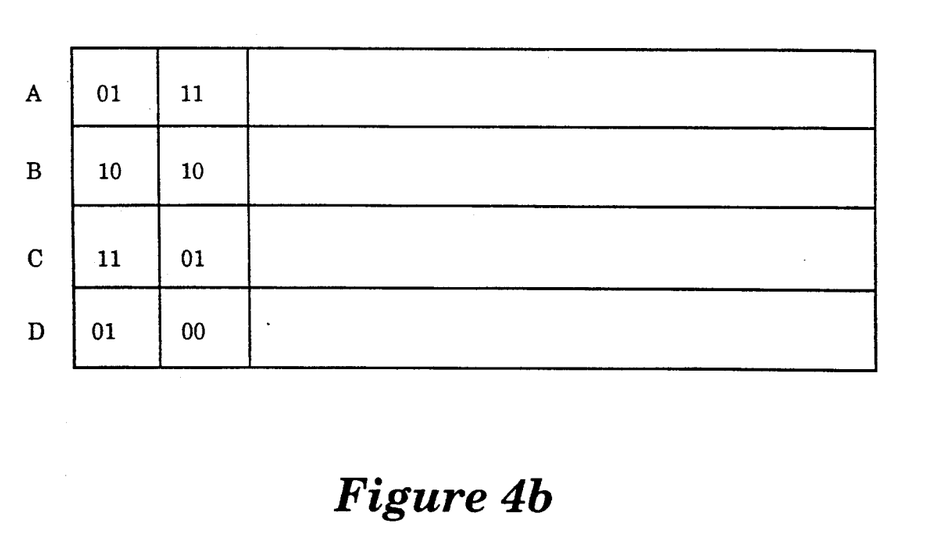

FIG. 4b illustrates an alternate embodiment of the present invention wherein the cache warmth bits not only identify the processor which executed the process, but the number of time-slices prior that the process was executed by a particular processor. Thus, for example, if Process A was executed by Processor 1 at time-slice 1, Process B was executed by Processor 2 at time-slice 2, Process C was executed by processor 3 at time-slice 3 and Process D was executed by Processor 1 at time-slice 4, the status bits at the end of time-slice 4 may look like that shown in FIG. 4b. In particular, Process D was executed by Processor 1, indicated by left-most binary value 01, at the current time-slice, indicated by the second binary value 00. Similarly, the status bits associated with Process A indicate that Process A was previously executed by Processor 1 (as indicated by the binary value 01) and was executed 3 time-slice periods previously (as indicated by the binary value 11). The scheduler may utilize this information to schedule Process A at the next time-slice to Processor 1 because Process A, as indicated by the cache warmth status bits for Process A located in the process table, was previously executed on Processor 1 and has been waiting the longest period of time (as indicated by the second binary value) for the availability of Processor 1. Similarly, the scheduler may utilize this information to maximize CPU utilization and cache warmth by scheduling the more recent processes executed by the processors more frequently and scheduling the processes least used only when a predetermined number of time-slices have passed. Such a scheduling scheme would have a similar effect to increasing the time-slice duration, since the maximum latency between execution intervals increases.

The cache warmth bits can also indicate a value to be used by the scheduler which indicates a number of cache misses that have occurred for any given process. This may then be used to perform scheduling operations. For example, the lower number of cache misses for a given process, the more likely the cache contains data related to that process. Thus, it may be more efficient to give a higher priority to that process while the cache contains process relevant data and lower priority to other processes which will incur cache misses when executed (because process related data is not currently located in the cache) and will therefore require time consuming memory operations in order to update the cache.

Furthermore, the scheduler may utilize the cache warmth information to perform load balancing, that is, the scheduler may schedule processes which require maximum CPU usage to a single processor while grouping those processes which are I/O intensive but not CPU intensive to other processors. This information can be derived for example, from information in the process table about whether the process was preempted or blocked on I/O when rescheduling occurred, the number of time slices passed and the number of times the processor was allocated to a process.

For example, if two processes A and B are executing on Processor $\phi$ and Process A is CPU intensive (70% CPU usage) and Process B is I/O intensive and not CPU intensive (e.g., a keyboard program, 30% CPU usage), Process A will be granted access to Processor $\phi$ more frequently because Process B requires little CPU time. If Process C is allocated to Processor 2 and similarly is I/O intensive and not CPU intensive (e.g., 20% CPU usage), the scheduler will be able to determine from the cache warmth bits and CPU utilization information in the process table (e.g., the amount of time the process has been executing) that Processor 2 is underutilized and it would be more efficient to allocate Process B to Processor 2 whereby Process A can have sole access to Processor 1.

A problem which sometimes arises in heavily loaded multiprocessing environments is resource thrashing. Thrashing of the cache occurs when processes executing replace a substantial portion of the processor's cache before the next process runs on that processor. The next process scheduled on that processor will incur numerous cache misses and also replace a substantial portion of the processor's cache entries with its process specific data. When the first process is subsequently rescheduled, to the same processor and thus, to the same cache, a number of cache misses are incurred and the cache entries are again replaced with data related to the first process. Because the time-slice interval is fixed and cache misses require the CPU to wait idly for data from memory, CPU utilization decreases dramatically when cache thrashing takes place. Thus, it is preferred that the scheduler take into account the problem of thrashing when scheduling processes. In particular, the cache warmth bits may be used to detect the presence of thrashing. For example, the cache warmth for a scheduled process is compared to a cache warmth threshold value indicative of thrashing. Thrashing is found to exist if two successive processes exceed the threshold value. Once thrashing is detected, the scheduling of processes can be modified to eliminate some of the deleterious effects of cache thrashing. For example, if thrashing is detected, the duration of time a process executes on a given processor can be increased by restricting rescheduling operations to occur at every other time interval. (See code in FIG. 6 for example.)

Although in the preferred embodiment the cache warmth bits are stored in the process table for easy access, the information regarding scheduling efficiency may incorporate other areas of the kernel and hardware such as the MMU or a separate or specified portion of kernel memory. For example, information regarding cache warmth for each process may be stored in the process description block or process table. Furthermore, the concept of cache warmth can be extended to instead track page faults which occur in a virtual memory system or other types of systems in which shared resources maintain process specific data.

Figure 6:
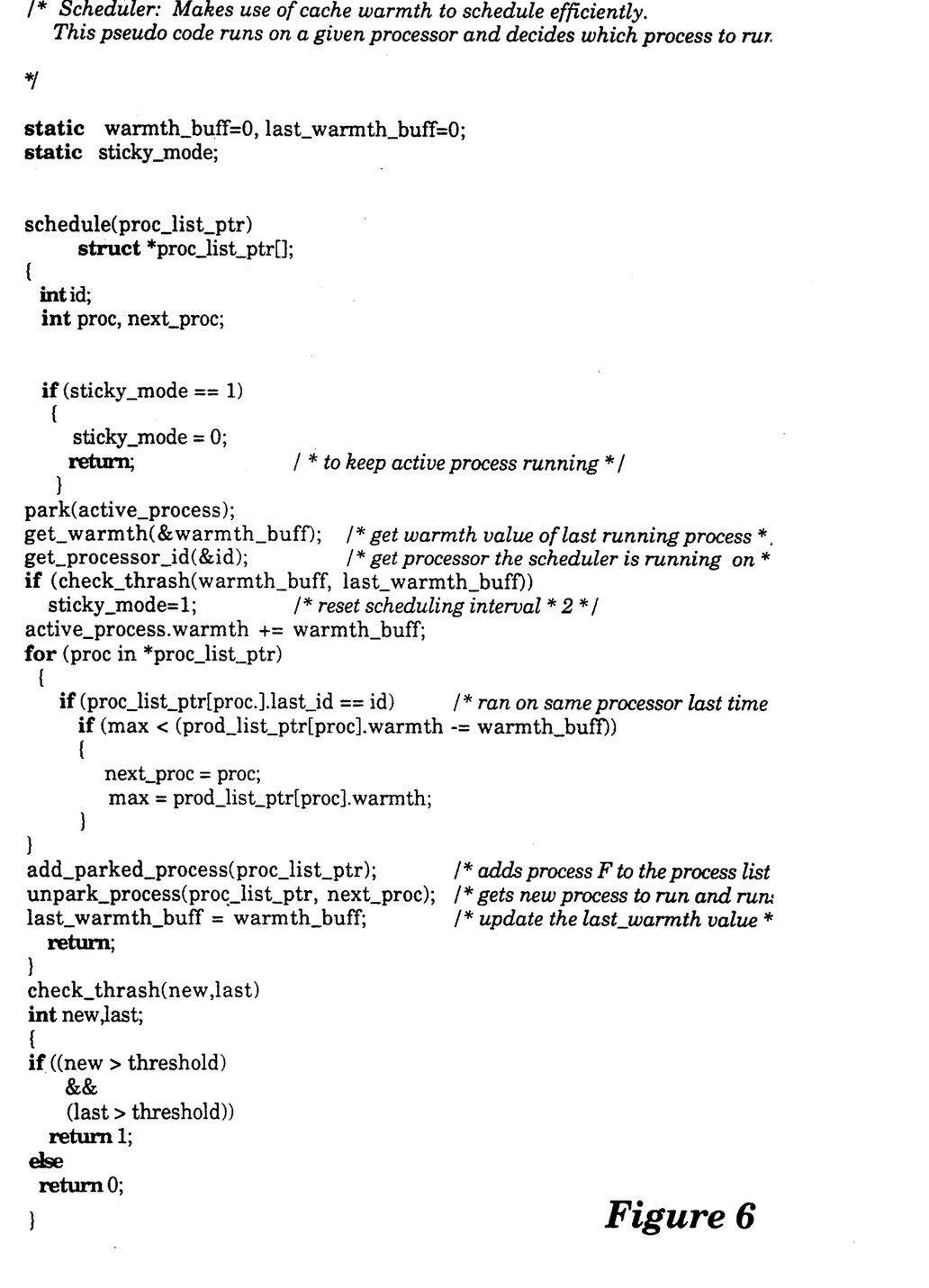
FIG. 6 is exemplary scheduling code which utilizes cache warmth to schedule efficiently.

The scheduler is modified slightly to include logic which utilizes the cache warmth bits to determine the priority of processes and the impact that scheduling a particular process would have in terms of CPU utilization. This logic may be implemented in hardware or software or a combination of both. For example, in hardware, a comparator is employed to compare the status bits identifying the processor ID upon which the process last executed to the processor ID of the next processor available to be scheduled. If the IDs do not match, the process will not be scheduled to that Processor but will wait to be scheduled upon the processor for which the IDs do match. FIG. 6 is an example of scheduler code which uses cache warmth to schedule efficiently and decide which process to run next. This scheduler also determines if thrashing is occurring, and if so, schedules the same process twice in succession to increase CPU utilization which would otherwise suffer during thrashing.

Figure 5:
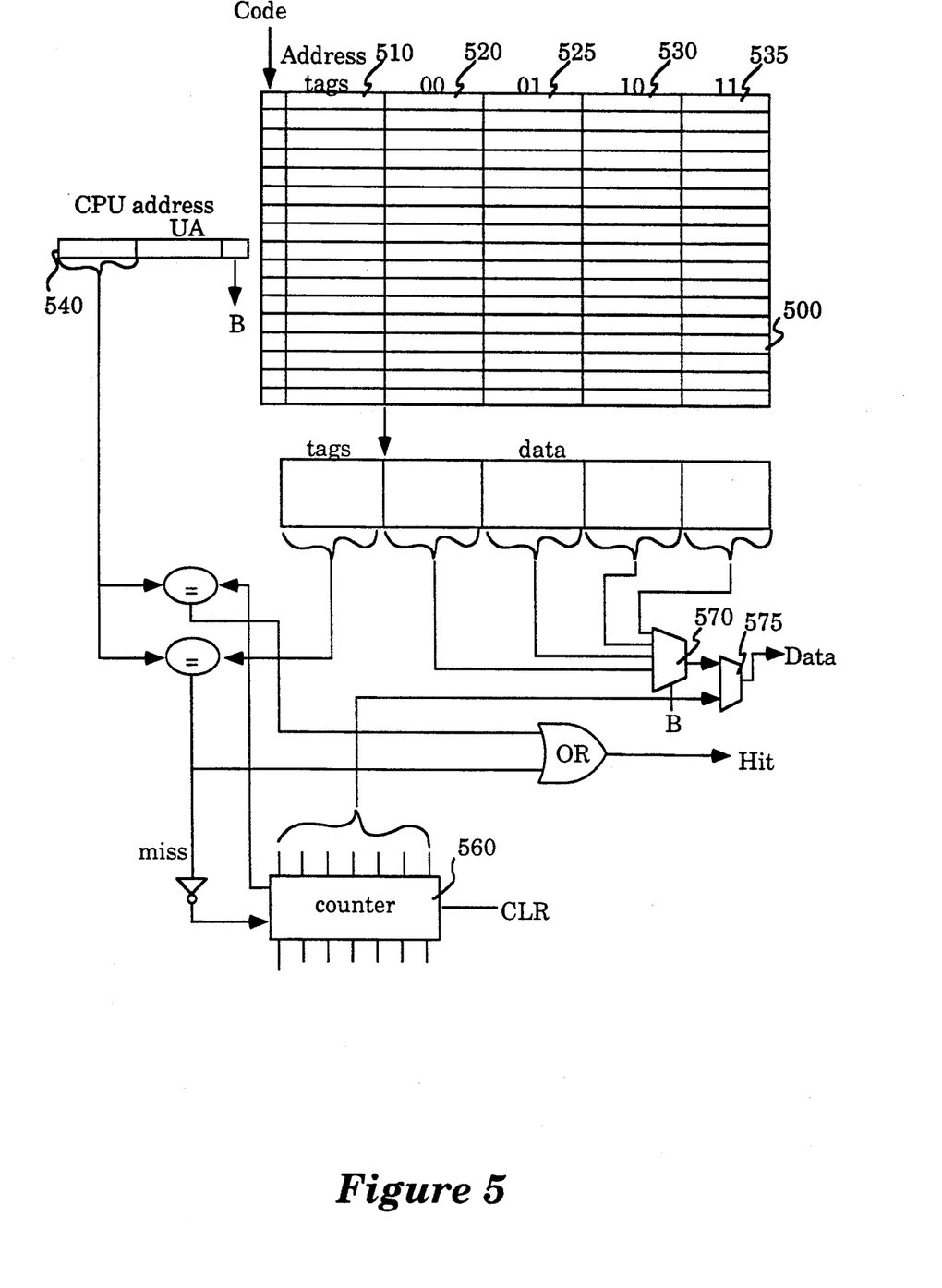
FIG. 5 illustrates exemplary logic implementing a preferred embodiment of the present invention.

A simple example of comparator logic is set forth in FIG. 5. The cache 500 comprises an address tag 510 and data 520, 525, 530, 535. The tag information generated from the CPU address is compared to the tag from the cache and, if they are equal, a cache hit is noted and the data from the cache is extracted through the multiplexors 570, 575. If the tags are not equal, a cache miss occurs and the counter 560 tracking the misses determinative of cache warmth is incremented and the cache is updated with data read from memory (not shown). This logic also provides a simple means to read the counter 560 by tracking it as an additional cache. A predetermined address is used to address the counter. A predetermined address is supplied to the cache and the cache supplies the value of the counter.

Preferably, the mechanism which tracks cache warmth, e.g., counter 560 (FIG. 5), does not record a miss, and therefore increase the cache warmth value, when the process is replacing its own data as this replacement is not indicative of the change of state of cache warmth. Therefore, in an alternative embodiment, the process context of the line of the cache to be replaced is compared to the context of the currently executing process. If the contexts are associated with the same process, (e.g., the contexts are equal), the counter is not incremented. If, however, they are different, then the line of memory being placed in the cache will alter the warmth of the cache. Once the counter associated with a segment has been determined, the method of comparing one scheduling context process of the line being replaced and the current executing scheduling context (e.g., executing process) process may be employed as outlined above.

The ability to model the degree to which the process executing on a particular CPU modifies the resources (cache or other) associated with that CPU is limited by the counter implementation which tracks the resource. Ideally, the counter would be able to differentiate the processes at the finest level of granularity, i.e., the smallest unit manipulated by the scheduling algorithm. For example, in a multiple processor system executing multi-threaded processes, the counter would use knowledge of the current thread of execution and information about the thread of execution of the line being replaced in the cache to determine whether or not to increment the counter. In this scheme the cache tags must contain added information, the unique ID that specifies the thread of execution or which group of threads to which the line belongs.

The cache and scheduling algorithm can be modified to utilize the technique of cache coloring. Coloring refers to segmenting the cache into regions and using a predetermined number of bits of the virtual address to generate a hash value which selects the cache region to which a process address maps. Coloring restricts different processes to different segments of the cache, and thus reduces aliasing of several addresses from different processes to the same line. In an embodiment which uses cache coloring, separate counters are maintained to track the cache warmth values in a cache segment. The bits used to generate a hash value also distinguish the counters between processes. Once the counter associated with a segment has been identified, the method of comparing contexts of the line being replaced and the process currently executing may be employed as previously discussed. Cache coloring will minimize the effect of a single process destroying all data in the cache by restricting its addresses to map to only one segment of the cache. Thus, a single process will only affect the one region of the cache it maps to, rather than the entire cache.

In an alternative embodiment not only the warmth value for the current process is updated, but also the warmth values for all other processes that previously executed on the same processor are updated. This provides greater accuracy in the cache warmth measurement. The technique operates as follows: after the process has run, the current process's cache warmth is updated by an increment equal to the number of cache misses which occurred. The cache warmth values for all the other remaining processes which ran on the same processor are decremented by an amount proportional to their respective current cache warmth value. This is illustrated by the example below:

|   | T1  |   |            |   | T2  |   |            |   | T3  |
|---|-----|---|------------|---|-----|---|------------|---|-----|
| A | 50  | — | (70*50/100)| = | 15  |   | (90*15/100)| = | 90  |
| B | 10  | — | (70*10/100)| = | 3   | — | (90*3/100) | = | 0   |
| C | 20  | — | (70*20/100)| = | 6   | — | (90*6/100) | = | 1   |
| D | 20  | — | (70*20/100)| = | 6   | — | (90*6/100) | = | 1   |
| E |     |   |            |   | 70  | — | (90*70/100)| = | 7   |
|   | 100 |   |            |   | 100 |   |            |   | 100 |

At time T1 Processes A, B, C, D respectively have cache warmth values of 50, 10, 20, 20 for a total cache warmth value of 100 process E is currently executing. At time T2 Process E (a new process) has run, resulting in a cache warmth value of 70 and a new process is selected for execution. The cache warmth values are proportionally adjusted according to the following equation: new cache warmth=old cache warmth—(old cache warmth * current process cache warmth/total cache warmth). Using these new values for warmth, the next process to run is selected. Assuming all processes have equal priority, Process A is selected to run at time T2.

Similarly, at time T3, process A finishes running with a cache warmth value of 90. The cache warmth values for processes B,C,D,E are proportionally decremented by the amount such that the total number of misses distributed among the processes is equal to the increased warmth assigned to the process previously executed. It follows that process E, which had the greatest proportion of the cache would similarly lose the greatest amount. The computed cache warmth values accurately reflects this.

While the invention has been described in conjunction with the preferred embodiment, it is evident that numerous alternatives, modifications, variations and uses will be apparent to those skilled in the art in light of the foregoing description. In particular, the invention described herein can be utilized with a variety of types of resources in order to maximize efficient usage of the resource. Further, a variety of types of processors may be employed. In addition, the present invention applies not only to processes but to the scheduling of any schedulable unit. An example of another schedulable unit is a thread of a process.

A traditional UNIX process contains a single thread of control. This thread consists of the sequence of executing instructions along with a minimal amount of state variables such as a program counter (PC) and stack frame (SF). A multi-processor system in which memory is shared by all processors can execute different processes (each with a single thread of control) concurrently. It is important to note that each process runs in its own memory space and contains a single thread of execution. Thus, concurrent process execution is the finest grain of parallelism achievable in a multi-processor environment with singly-threaded processes.

A multi-threaded UNIX process contains several threads of control. Each thread in a multi-threaded process consists of the sequence of instructions being executed by that particular thread and a collection of state variables that are unique to the thread. Thus, each thread contains its own PC and SF variables. Multiple threads allow for parallelism and concurrent execution within a process when more than one processor is available. A multi-processor system in which memory is shared by all processors can execute different threads (from one or multiple processes) concurrently. It is important to note that each process runs in its own memory space as before, but now multiple threads of execution share the same memory space, thus the need for unique state variable (PC and SF among others) for each thread. Therefore, concurrent thread execution is the finest grain of parallelism achievable in a multi-processor environment with multiply-threaded processes. For further information see, Powell et al., "Sunos Multi-Thread Architecture," USENIX, Winter, 1991.

From the above discussion, it should be clear that a multiple processor system running only one single-threaded process will take the same amount of execution time as a single processor system because there is no means for parallel execution. However, multi-threaded processes will be able to exploit concurrent thread execution, and thus, make use of several processors to speed execution of the process.

The present invention is therefore applicable to any system with multiple threads of execution executing concurrently. These threads may consist of several singly-threaded processes or threads from one or more multi-threaded processes or a mixture of singly-threaded and multi-threaded processes.

What is claimed is:

1. In a computer system comprising multiple processors and at least one resource associated with, and coupled to, each processor, each processor executing in the context of a schedulable unit for a time slice before switching to execute in the context of another schedulable unit, an apparatus for efficiently scheduling schedulable units to be executed on the processors, said apparatus comprising:

a process table comprising resource warmth information regarding each schedulable unit, each processor being identified by a processor ID and, if said schedulable unit has previously executed in a processor, said resource warmth information comprising information indicating the processor ID of the processor on which the schedulable unit was previously executed;

a process scheduler, said process scheduler coupled to said process table and to each said processor, said process scheduler comprising a comparator to compare the processor ID of a schedulable unit to be scheduled with the corresponding processor ID stored in the process table, such that, if the schedulable unit has executed previously, the schedulable unit is scheduled with the corresponding processor the ID of which matches the processor ID stored in the process table.

2. The apparatus as set forth in claim 1, wherein said resource is a cache memory and said resource warmth information associated with a schedulable unit identifies the number of cache misses that have occurred on the cache associated with the identified processor, said process scheduler utilizing resource warmth information to determine the processor upon which the schedulable unit is to be scheduled by scheduling the schedulable unit to be scheduled with the processor if the number of cache misses does not exceed a second predetermined number.

3. The apparatus as set forth in claim 2, wherein the number of cache misses which have occurred include cache misses due to data in the cache associated with another schedulable unit which cause a line of data in the cache to be replaced with data from another schedulable unit.

4. The apparatus as set forth in claim 2, wherein the cache is divided into a plurality of regions, each region having separate cache miss information, each region utilized by a different group of schedulable units, whereby the effect of extensive use of the cache by a single schedulable unit is minimized.

5. The apparatus as set forth in claim 2, wherein the resource warmth information for a schedulable unit is used to calculate a resource warmth value for the schedulable unit, said apparatus further comprising a total resource warmth value corresponding to the sum of resource warmth values for the schedulable units accessing a resource, wherein when the resource warmth value for a schedulable unit increases, the resource warmth values for other schedulable units accessing the resource decrease in proportion to their respective resource warmth values such that the total resource warmth value remains constant and the resource warmth values more accurately reflect cache usage by the schedulable units.

6. The apparatus as set forth in claim 3, wherein the resource associated with a processor comprises multiple levels of caches and the information indicative of cache warmth comprises information for each cache.

7. The apparatus as set forth in claim 1, wherein said resource warmth information further comprises information to identify the number of time slices since the schedulable unit was last executed on the processor and said schedulable unit is scheduled with the processor if the number of timeslices does not exceed a first predetermined number.

8. The apparatus as set forth in claim 1, wherein said resource comprises a virtual memory and said resource warmth information further comprises information to identify the number of page-faults that have occurred in the virtual memory associated with the identified processor, said process scheduler utilizing that information to determine the processor on which the schedulable unit is to be scheduled by scheduling the schedulable unit to be scheduled with the processor if the number of page-faults does not exceed a third predetermined number.

9. The apparatus as set forth in claim 1, wherein the schedulable unit is a process.

10. The apparatus as set forth in claim 1, wherein the schedulable unit is a thread of a process.

11. In a computer system comprising multiple processors and at least one cache memory associated with, and coupled to, each processor, each processor executing in the context of a schedulable unit for a time slice before switching to execute in the context of another schedulable unit, an apparatus for efficiently scheduling schedulable units to be executed on the processors, said apparatus comprising:

a process table comprising cache warmth information regarding each schedulable unit, each processor being identified by a processor ID and, if said schedulable unit has previously executed in a processor, said cache warmth information comprising information indicating the processor ID of the processor on which the schedulable unit was previously executed;

a process scheduler, said process scheduler coupled to said process table and to each said processor, said process scheduler comprising a comparator to compare the processor ID of a schedulable unit to be scheduled with the corresponding processor ID stored in the process table, such that, if the schedulable unit has executed previously, the schedulable unit is scheduled with the corresponding processor the ID of which matches the processor ID stored in the process table.

12. The apparatus as set forth in claim 11, wherein the schedulable unit is a process.

13. The apparatus as set forth in claim 11, wherein the schedulable unit is a thread of a process.

14. The apparatus as set forth in claim 11, wherein said cache warmth information further comprises information to identify the number of time slices since the schedulable unit was last executed on the processor and said schedulable unit is scheduled with the processor if the number of timeslices does not exceed a first predetermined number.

15. The apparatus as set forth in claim 11, wherein said cache warmth information associated with a schedulable unit identifies the number of cache misses that have occurred on the cache associated with the identified processor, said process scheduler utilizing cache warmth information to determine the processor upon which the schedulable unit is to be scheduled by scheduling the schedulable unit to be scheduled with the processor if the number of cache misses does not exceed a second predetermined number.

16. In a computer system comprising multiple processors and at least one cache memory associated with each processor, each processor executing in the context of a schedulable unit for a time slice before switching to execute in the context of another schedulable unit, a method for efficiently scheduling schedulable units to be executed on the processors, said method comprising the steps of:

providing a process table comprising information regarding each schedulable unit, said process table comprising information indicative of cache warmth, said cache warmth information including information indicative of the processor upon which the schedulable unit was previously executed if the schedulable unit was previously executed;

maintaining in the process table the cache warmth information regarding each schedulable unit;

scheduling a schedulable unit to a processor according to the cache warmth such that if a schedulable unit to be scheduled was previously executed, the schedulable unit to be scheduled is scheduled on the processor upon which schedulable unit to be scheduled was previously executed.

17. The method as set forth in claim 16, wherein said cache warmth information identifies the number of time slices since the schedulable unit was last executed on the processor and said schedulable unit is scheduled with the processor if the number of timeslices does not exceed a first predetermined number.

18. The method as set forth in claim 16, wherein said cache warmth information identifies the number of cache misses that have occurred on the cache associated with the identified processor, said method comprising steps to utilize that information to determine the processor upon which the schedulable unit will subsequently execute by scheduling the schedulable unit to be scheduled with the processor if the number of cache misses does not exceed a second predetermined number.

19. The method as set forth in claim 16, wherein each processor is identified by a processor ID and said process table comprises information indicating the processor ID of the processor upon which the schedulable unit was previously executed, said step of scheduling comprising the steps of comparing the processor ID with the processor ID stored in the process table, whereby the schedulable unit is scheduled with the processor having a processor ID which matches the processor ID stored in the process table.

20. The method as set forth in claim 16, wherein the schedulable unit is a process.

21. The method as set forth in claim 16, wherein the schedulable unit is a thread of a process.

* * * * *

UNITED STATES PATENT AND TRADEMARK OFFICE
CERTIFICATE OF CORRECTION

PATENT NO. : 5,287,508
DATED : February 15, 1994
INVENTOR(S) : Hejna, Jr. et al.

It is certified that error appears in the above-identified patent and that said Letters Patent is hereby corrected as shown below:

In column 9, claim 6 at line 49, please delete " 3 " and insert -- 2 --.

Signed and Sealed this

Twenty-third Day of December, 1997

Attest:

BRUCE LEHMAN

Attesting Officer

Commissioner of Patents and Trademarks